3,751,376
IONIC POLYMERS
Jean-Pierre Quentin, Lyon, France, assignor to Rhone-Poulenc S.A., Paris, France
No Drawing. Filed June 16, 1971, Ser. No. 153,895
Claims priority, application France, June 18, 1970, 7022514
Int. Cl. C08g 23/10
U.S. Cl. 260—2.1 R          14 Claims

ABSTRACT OF THE DISCLOSURE

Shaped or unshaped ionic polymers are provided which comprise recurring units of formula $$-O-E-O-CHR-CR_1-CH_2-$$
$$\underset{O-\left(\underset{\underset{A}{|}}{CR_2}-\underset{\underset{B}{|}}{CR_3}-O\right)_x-H}{}$$ (I)

alone or with recurring units of formula $$-O-E-O-CHR-CR_1-CH_2-$$
$$\underset{OH}{}$$ (II)

and/or formula $$-O-E-O-CHR-CR_1-CH_2-$$
$$\underset{O-\left(\underset{\underset{A'}{|}}{CH_2}-\underset{\underset{B'}{|}}{CR_3}-O\right)_y-H}{}$$ (III)

in which each of R, $R_1$, $R_2$ and $R_3$, which may be the same or different, represents a hydrogen atom or a methyl radical,
E represents a divalent radical derived by removing the phenolic OH groups from a polynuclear diphenol in which the hydroxyl groups are attached to different nuclei,
$x$ and $y$ are positive numbers,
one of A and B represents a hydrogen atom and the other represents a radical of formula $$-CH_2-\overset{\oplus}{N}\diagdown_{R'\cdot Y^\ominus}^{R'}$$

in which $Y^\ominus$ is an anion and each of the symbols R', which may be the same or different, represents a monovalent or divalent organic radical, or at least two of the radicals together form a single divalent or trivalent radical, all the valencies carried by the R' groups being satisfied by nitrogen atoms of groups —$CH_2$—$N^\oplus$, and one of A' and B' represents a hydrogen atom and the other represents the —$CH_2X$ group, wherein X is a halogen atom.

These polymers have utility as anti-static agents, in improving the dye affinity of natural and synthetic polymers and as ion-exchange membranes.

---

The present invention relates to ionic polymers having, inter alia, ion exchange properties.

The polymers of the present invention comprise recurring units of formula:

$$-O-E-O-CHR-CR_1-CH_2-$$
$$\underset{O-\left(\underset{\underset{A}{|}}{CR_2}-\underset{\underset{B}{|}}{CR_3}-O\right)_x-H}{}$$ (I)

alone or with recurring units of formula:

$$-O-E-O-CHR-CR_1-CH_2-$$
$$\underset{OH}{}$$ (II)

and/or units of formula:

$$-O-E-O-CHR-CR_1-CH_2-$$
$$\underset{O-\left(\underset{\underset{A'}{|}}{CR_2}-\underset{\underset{B'}{|}}{CR_3}-O\right)_y-}{}$$ (III)

in which each of R, $R_1$, $R_2$ and $R_3$, which may be the same or different, represents a hydrogen atom or a methyl radical,
E represents a divalent radical derived by removing the phenolic OH groups from a polynuclear diphenol in which the hydroxyl groups are attached to different nuclei,
$x$ and $y$ are positive numbers, which can be fractional if, as is possible, Formulae I and III are used to represent the average units of the polymer,
one of A and B represents a hydrogen atoms and the other represents a radical of formula:

$$-CH_2-\overset{\oplus}{N}\diagdown_{R'}^{R'}\cdot Y^\ominus$$

in which $Y^\ominus$ is an anion and each of the symbols R', which may be the same or different, represents a monovalent or divalent organic radical, or at least two of the radicals together form a single divalent or trivalent radical; all the valencies carried by the R' groups being satisfied by nitrogen atoms of groups —$CH_2$—$N^\oplus$; the three R' radicals together usually posssess 3 to 12 carbon atoms, and
one of A' and B' represents a hydrogen atom and the other represents a radical of formula —$CH_2X$, wherein X is a halogen atom, preferably chlorine.

The divalent radical E preferably has the formula $$-\underset{(Y)_m}{\underset{|}{\bigcirc}}-R_4-\underset{(Y_1)_z}{\underset{|}{\bigcirc}}-$$

in which each of Y and $Y_1$, which may be the same or different, represents an alkyl or alkoxy radical having 1 to 4 carbon atoms; $R_4$ is an alkylene or alkylidene radical having 1 to 3 carbon atoms, such as methylene, ethylene, 1,3-propane-diyl or 2,2-propane-diyl; $m$ and $z$ can have one of the values 0, 1, 2, 3 or 4.

Suitable monovalent radicals R' include alkyl radicals optionally substituted by functional groups, such as hydroxyl groups.

If R' is a divalent radical or if the two radicals R' form a trivalent group, these groups link together two $$-CH_2-\overset{\oplus}{N}\diagdown$$

groups, which can belong to different macromolecular chains. Suitable such radicals include alkylene and alkenylene radicals preferably having fewer than 5 carbon atoms.

Suitable divalent or trivalent radicals R' of which at least two free valencies are attached to one and the same nitrogen atom, include alkanediyl, alkanetriyl, alkendiyl, alkenetriyl, alkylylidene, and alkenylylidene radicals, preferably such radicals which have 4 to 5 carbon atoms in the chain located between the two valencies connected to the same nitrogen atom.

The nature of the anion $Y^\ominus$ is not a characteristic of the invention. It is possible to change the anion $Y^\ominus$ by the usual methods of ion exchange, especially in the course of using the polymers, without fundamentally changing the nature and properties of the polymers. Most commonly $Y^\ominus$ represents a halide, nitrate, sulphate, sulphite, phosphate or arylsulphonate anion.

The present invention also provides copolymers formed from the units indicated above and also units of Formulae I′, II′ and III′ which are derived from the Formulae I, II and III by removal of the hydrogen atoms of the OH groups, the resulting oxygen atoms carrying a free valency being joined by organic radicals $R_5$ of valency at least 2, which thus produce crosslinking.

The present invention also relates to a process for the preparation of the copolymers defined above. According to this process, the copolymers are prepared by reaction of an epihalogenohydrin with copolymers consisting of units of Formula II, and quaternary nitrogen atoms are then introduced into the halogenated copolymers thus obtained.

In this specification, copolymers consisting of units of Formula II will be described as "phenoxy resins" and the copolymer produced by the reaction of the epihalogenohydrin with a phenoxy resin will be described as "intermediate halogenated copolymer."

The phenoxy resins which can be used in the process of the invention are advantageously prepared according to the technique described in U.S. Pat. No. 3,294,747. Their reduced viscosity (measured at 25° C. in dimethylformamide, at a concentration of 2 g./l. is preferably between 15 and 120 cm.³/g.

The epihalogenohydrins which can be used in the process of the invention have the formula:

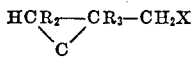

in which $R_2$, $R_3$ and X have the meanings given above, such as epichlorohydrin, epibromohydrin, epiiodohydrin, 1,2-epoxy-1-methyl-3-chloro-propane and 1,2 - epoxy - 2-methyl-3-chloro-propane. Epichlorohydrin, which is a more common industrial product, is usually employed.

The reaction of the epihalogenohydrin with the phenoxy resins is advantageously carried out in a solvent for the phenoxy resin and in the presence of a catalyst consisting of a Lewis acid or of a compound capable of liberating a Lewis acid under the reaction conditions. Non-polar organic solvents which are not electron donors, especially chlorinated aliphatic hydrocarbons or aromatic hydrocarbons such as benzene, toluene and xylenes, are advantageously used as the solvent. As the Lewis acid, boron trifluoride, tin tetrachloride, aluminium trichloride and titanium tetrachloride are advantageously used. The addition products of Lewis acids with ethers may be used to advantage as compounds capable of liberating a Lewis acid under the reaction conditions.

The amount of catalyst employed is usually between 0.01 and 10% by weight of the polymer solution, preferably between 0.1 and 1%. The reaction temperature is generally between 20° and 150° C., preferably between 50° and 90° C.

The amount of epihalogenohydrin employed is usually such that the ratio of this amount, expressed in mols relative to the number of hydroxyl groups present in the polymer, is between 0.2 and 5. The reaction is generally continued until the ratio of the number of mols of epihalogenohydrin which have reacted to the number of hydroxyl units initially present is between 0.05 and 4 (in other words, until the total of $x$ and $y$ has an average value of between 0.05 and 4).

The quaternary ammonium groups can be introduced into the intermediate halogenated copolymer in accordance with any known method; usually, the intermediate halogenated copolymer is reacted with a tertiary amine. The latter can be a monoamine or a polyamine. The use of polyamines results in polymers of this invention which are generally insoluble in the customary solvents. The reaction between the intermediate halogenated copolymer and the tertiary amine is herein after referred as "quaternisation."

Suitable tertiary amines which may be used, include: trialkylamines such as trimethylamine, triethylamine and tripropylamine; the alkyl radicals can carry functional groups, as with the N-alkylalkanolamines and trialkanolamines, for example dimethylethanolamine and triethanolamine; heterocyclic amines, such as pyridine, picolines, lutidines, N-alkylpiperidines, and N,N′ - dialkyl - piperazines; quinoxaline and N-alkylmorpholines; juxtanuclear aromatic amines, such as N,N-diamethylaniline; and extranuclear aromatic amines. The amines used usually have 3 to 12 carbon atoms.

The reaction between the amine and the intermediate halogenated copolymer takes place by bringing these two reagents into contact. The reaction temperature is generally between 0° and 150° C., preferably between 15° and 90° C. The amine can be used as such if it is liquid under the reaction conditions, or in the form of a solution. The intermediate halogenated polymer may be soluble or insoluble in the amine or in its solution.

The number of quaternary ammonium groups introduced is generally greater than or equal to 70% of the number of halogen atoms present in the intermediate halogenated copolymer, and preferably greater than or equal to 90% of this number.

The preparation of ion exchange membranes composed of copolymers of this invention can be effected in various ways, for example by hot pressing, by calendering or by casting a solution, depending on the circumstances. The latter process is preferably used if the amine used to react with the intermediate halogenated polymer is a monoamine. Suitable solvents include aprotic polar solvents, especially dimethylformamide (DMF). If the reaction between the monoamine and the intermediate halogenated polymer has been carried out in solution in such a solvent, the membranes can be prepared directly by casting the reaction mixture. If this reaction has been carried out in suspension, for example in water, the preparation of a membrane by casting the polymer obtained should first be isolated and then dissolved in a solvent.

Where the amine used is a polyamine, it can be more advantageous first to produce a film of the said intermediate halogenated polymer and then react the polyamine therewith. This forming of a film is preferably carried out by casting a solution, and, in this case, the solvents which may be used include chlorinated aliphatic solvents, such as chloroform, methylene, chloride and 1,2-dichloroethane, and polar solvents, such as dimethylformamide.

The polymers of this invention which are crosslinked by polyvalent radicals $R_5$ can be obtained by carrying out a supplementary crosslinking operation after introducing quaternary ammonium groups, as indicated above. This crosslinking may be effected by using the crosslinking agents normally employed with vinyl alcohol polymers, in particular formaldehyde, urea-formaldehyde pre-condensates, dimethylolurea, trimethylolmelamine, hexa(methoxymethyl)melamine, chlorinated polyethylene glycol and polyepichlorohydrin.

It is also possible to prepare ion exchange membranes reinforced by a screen, for example by effecting the above-mentioned casting onto a woven fabric or a net. Generally in such reinforced membranes the support represents less than 75%, preferably less than 50% by weight, based on the weight of the membrane.

The copolymers according to the invention can also be used as antistatic agents, as well as for improving the dyeing affinity of natural or synthetic polymers.

An important advantage of the copolymers according to the invention resides in the fact that they give rise to membranes of good stability in an acid medium and under hot conditions.

The mechanical properties of the unshaped polymers and of the membranes according to the invention can be further improved by subjecting them to the action of a base, for example sodium hydroxide or potassium hydroxide. Though the mechanism of this reaction is not known with certainty, it is thought that it involves crosslinking by dehydrochlorination between the OH groups of the units of Formulae I, II, and III and the halogen atoms of the units of Formula III. This reaction is usually carried out at temperatures ranging from 10° C. to 80° C., with alkaline reagents in aqueous or alcoholic solutions of normality between 0.5 N and 5 N. Though this treatment with alkaline bases is useful for improving the mechanical properties of the membranes, it is, however, not indispensable and, if, for example, the amine $N(R')_3$ is a monoamine, industrially useful membranes can be prepared without having to carry out supplementary treatments of the film produced by casting.

The membranes of the present invention can, in particular, be used in electrodialysis, in reverse or direct osmosis, in dialysis and in fuel piles.

In the text which follows various examples which further illustrate the present invention are given. The qualities of the ion exchange membranes are evaluated with the following tests and measurements:

(a) Electrical substitution resistance: the term, for a given membrane surface area, is the variation in the electrical resistance of a liquid cylinder if the membrane is replaced by a cylinder of liquid of the same thickness and of the same surface area as the membrane, in a position at right angles to the axis of the cylinder. In the present case, this substitution resistance is measured in an 0.6 M aqueous solution of KCl; it is expressed in ohm·cm.²

(b) Permeation selectivity: this is the ability of the membrane to allow only anions to pass whilst stopping cations.

This permeation selectivity can be calculated from the electromotive force (E) measured between two aqueous KCl solutions, respectively 0.4 M and 0.8 M, separated by the membrane in question, which has beforehand been saturated with an aqueous 0.6 M solution of KCl.

The formula which gives the permeation selectivity as a percentage is:

$$\frac{P}{100}=\frac{\bar{t}-t}{1-t}$$

in which $t$ is the transport number of the $Cl^\ominus$ ion and $\bar{t}$ is the transport number of the same ion in the membrane.

$\bar{t}$ is given by the formula:

$$\bar{t}=\frac{E+E_o}{2E_o}$$

in which $$E_o=\frac{RT}{F}\ln\frac{a_1}{a_2}$$

wherein

R = gas constant
T = absolute temperature
F = Faraday constant (96,489 coulombs per gram equivalent)
$a_1$ = activity of the electrolyte in the more concentrated compartment (calculated from the concentration of the electrolyte and the activity coefficient).
$a_2$ = activity of the electrolyte in the less concentrated compartment.

(c) Bursting strength: this is measured in accordance with Standard Specification PN AFNOR Q 0314 relating to paper and carboard testing. A membrane fixed on a support frame which leaves a free surface area of 10 cm.² is subjected to the action of a hydraulic pressure via a rubber membrane. The bursting pressure, that is to say the hydraulic pressure (in bars) at the moment of brusting, is measured. The deflection of the stretched membrane at the time of bursting is also measured.

(d) Theoretical exchange capacity: the resin or membrane is washed with N/10 sulphuric acid solution and the amount of acid which has not been absorbed is measured. The number of mols of sulphuric acid retained by the resin is deduced therefrom by difference; the ratio of the number of milliequivalents (meq.) of acid retained to the weight of dry resin is the theoretical exchange capacity of the membrane.

EXAMPLE 1

The following polymer was used as the phenoxy resin starting material,
Recurring unit

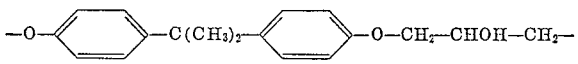

Reduced viscosity 52 cm.³/g. in dimethylformamide (DMF) at a concentration of 2 g./l.

15 g. of this resin were dissolved in 75 cm.³ of chloroform. The mixture was heated under reflux, whilst stirring, and 7.8 g. of epichlorohydrin were added, followed by a solution of 0.3 cm.³ of boron trifluoride etherate in 30 cm.³ of chloroform, added gradually over 30 minutes. Heating and stirring were continued for 1 hour 30 minutes, and the mixture then cooled and poured into 500 cm.³ of isopropanol. The product was filtered off, washed with methanol and dried for 12 hours at 40° C. under a pressure of 100 mm. of mercury.

17.7 g. of an intermediate chlorinated copolymer containing 8.4% of chlorine were thus obtained. 5 g. of this polymer were suspended in 100 cm.³ of a 25% by weight aqueous trimethylamine solution. The mixture was heated at 50° C. for 48 hours and evaporated to dryness, the residue was redissolved in 30 cm.³ of DMF, and the solution cast onto a 12 cm. x 20 cm. sheet of glass and dried at 50° C. for 12 hours.

An ion exchange membrane having a substitution resistance of 2 Ω·cm.² and a permeation selectivity of 70% was obtained. Its bursting pressure was 2 bars, and the deflection at the time of rupture was 7.4 mm. The theoretical exchange capacity was 1.45 meq./g.

EXAMPLE 2

An intermediate chlorinated copolymer was prepared as in Example 1, but using 0.15 cm.³ (in place of 0.3 cm.³) of boron trifluoride etherate. This copolymer, which contains 6.6% of chlorine was treated with trimethylamine as in Example 1, but at 70° C. (instead of 50° C.). Following the procedure of Example 1, an ion exchange membrane having a substitution resistance of 4 Ω·cm.² and a permeation selectivity of 74% was obtained. Its bursting pressure was 2.8 bars, and the deflection at the time of rupture was 12.3 mm. The theoretical exchange capacity was 1.15 meq./g.

EXAMPLE 3

An intermediate chlorinated copolymer was prepared as in Example 1, but using 6.5 g. of epichlorohydrin (instead of 7.8 g.). This copolymer contained 7.75% of chlorine. On carrying out the sequence of operations, especially the treatment with trimethylamine, as in Example 1, an ion exchange membrane was obtained having a substitution resistance of 3.5 Ω·cm.² and a permeation selectivity of 73%. Its bursting pressure was 2.3 bars, and the deflection at the time of rupture was 6.1 mm. The theoretical exchange capacity was 1.3 meq./g.

EXAMPLE 4

An intermediate chlorinated copolymer prepared as in Example 2 was treated with trimethylamine as in Example 1. On carrying out the sequence of operations as in Example 1, an ion exchange membrane was obtained which had a substitution resistance of 9.5 Ω·cm.², a permeation selectivity of 86%, and a bursting pressure of 2.45 bars, the deflection at the time of rupture being 6.5 mm. The theoretical exchange capacity was 1.16 meq./g.

EXAMPLE 5

5 g. of intermediate chlorinated copolymer prepared as in Example 2 were suspended in 100 cm.³ of a 25% by weight aqueous pyridine solution. The mixture was heated at 70° C. for 18 hours and evaporated to dryness. The procedure of the preceding examples was then followed; an ion exchange membrane was obtained which had a substitution resistance of 12 Ω·cm.², a permeation selectivity of 86% and a bursting pressure of 2.3 bars, the deflection at the time of rupture being 5.5 mm.; the theoretical exchange capacity was 0.95 meq./g.

EXAMPLE 6

The following polymer was used as the phenoxy resin starting material,

Recurring unit: the same as in Example 1.
Reduced viscosity 36 cm.³/g. (in DMF at a concentration of 2 g./l.).

50 g. of this resin were dissolved in 250 cm.³ of chloroform. The mixture was heated under reflux, whilst stirring, and 17.3 g. of epichlorohydrin were added, gradually followed, over 30 minutes, by a mixture of 1 cm.³ of boron trifluoride etherate and 49 cm.³ of chloroform. Heating and stirring were continued for a further 1 hour 30 minutes and then the mixture was cooled and poured into 2.5 litres of isopropanol; the product was filtered off and washed with three 500 cm.³ portions of methanol. After drying, 53 g. of a polymer containing 7% of chlorine was obtained.

5 g. of this intermediate chlorinated copolymer was suspended in 100 cm.³ of a 25% by weight aqueous trimethylamine solution. The mixture was heated at 70° C. for 18 hours and the process continued as in the preceding examples. An ion exchange membrane was thus obtained, having a substitution resistance of 12.5 Ω·cm.², a permeation selectivity of 86%, and a bursting pressure of 2.55 bars, the deflection at the time of rupture being 5 mm. The theoretical exchange capacity was 1.1 meq./g.

EXAMPLE 7

5 g. of the intermediate chlorinated copolymer prepared as in Example 3 were dissolved in 95 g. of a 20% by weight solution of trimethylamine in dimethylformamide. The solution thus obtained was heated for 48 hours at 70° C. and then cast onto a glass plate having a surface area of 300 cm.². The solution was dried at 50° C. for 12 hours.

A membrane was thus obtained having a permeation selectivity of 86%, a substitution resistance of 4.5 Ω·cm.², and a theoretical exchange capacity of 1.6 meq./g. Its bursting pressure was 1.6 bars, and the deflection at the time of rupture was 6 mm.

EXAMPLE 8

An intermediate chlorinated copolymer was prepared as in Example 6, but using 0.5 cm.³ of boron trifluoride etherate (in place of 1 cm.³) and 20.7 g. of epichlorohydrin (in place of 17.3 g.). 5 g. of this copolymer were dissolved in 95 g. of a 30% by weight solution of trimethylamine in dimethylformamide. The solution thus obtained was heated for 48 hours at 70° C. and cast onto a 300 cm.² glass plate.

After drying for 12 hours at 50° C., a membrane was obtained which had a permeation selectivity of 80%, a substitution resistance of 2 Ω·cm.² and a theoretical exchange capacity of 1.3 meq./g. Its bursting pressure was 1.25 bars, and the deflection at the time of rupture was 5.7 mm.

EXAMPLE 9

The following polymer was used as the phenoxy resin starting material,

Recurring unit: the same as in Example 1.
Reduced viscosity: 50 cm.³/g. (in DMF at a concentration of a 2 g./l.).

7 g. of this resin were dissolved in 35 cm.³ of chloroform. The mixture was heated under reflux and 3.04 g. of epichlorohydrin added whilst stirring, followed by a solution consisting of 20 cm.³ of chloroform and 0.15 cm.³ of boron trifluoride etherate, added gradually over 30 minutes. Heating and stirring were continued for a further 1 hour 30 minutes, the mixture was then cooled and poured into 250 cm.³ of isopropanol, and the product filtered off and washed with three 150 cm.³ portions of methanol. After drying 7.7 g. of a polymer containing 6% of chlorine were obtained.

5 g. of this copolymer were suspended in 100 cm.³ of a 25% by weight aqueous solution of trimethylamine. The solution thus obtained was heated for 18 hours at 70° C., cast onto a glass plate of 240 cm.² surface area, and then dried for 12 hours at 50° C.

A membrane was thus obtained having a permeation selectivity of 74%, a substitution resistance of 7 Ω·cm.², and a theoretical exchange capacity of 1.1 meq./g. Its bursting pressure was 3.5 bars, and the deflection at the time of rupture was 10 mm. The linear elongation after immersion in water for at least 24 hours was measured on a part of this membrane; this elongation was 10%.

The membrane was then immersed in 2 N sulphuric acid for 196 hours at 70° C. Its performance was again measured: Permeation selectivity: 72%; substitution resistance: 8 Ω·cm.²; theoretical exchange capacity: 1.14 meq./g.; bursting pressure 2.85 bars; deflection at rupture 7.4 mm.

EXAMPLE 10

Example 9 was repeated, carrying out the reaction with trimethylamine at 50° C. (in place of 70° C.) A membrane having a permeation selectivity of 82%, a substitution resistance of 4.5 Ω·cm.² and a theoretical exchange capacity of 1.05 meq./g. was obtained; its bursting pressure was 1.75 bars; and the deflection at the time of rupture was 7 mm.; its linear elongation on immersion in water for 24 hours was 10%.

A sample of this membrane was subjected to the aging test described in the last paragraph of the preceding example. After this test, the performance of this membrane is as follows: Permeation selectivity: 74%; substitution resistance: 5 Ω·cm.²; theoretical exchange capacity: 1.08 meq./g.; bursting pressure: 1.35 bars: deflection at rupture: 5.6 mm.

EXAMPLE 11

2.5 kg. of a phenoxy resin similar to that used in Example 9 were dissolved in 17 litres of chloroform (water content of the medium: 0.02%); the mixture was heated to the boil and 978 g. of epichlorohydrin added, followed by a solution of 25 cm.³ of BF₃ etherate in 2.5 litres of chloroform, added gradually over 30 minutes. Heating was continued for 1 hour 30 minutes, the mixture was cooled and the product washed, dried and ground.

2860 g. of a polymer containing 8.3% of chlorine were thus obtained. 2 kg. of this polymer were dissolved in 10 kg. of dimethylformamide together with 2.7 kg. of trimethylamine. The mixture was heated at 70° C. for 40 hours; the solution was partially evaporated by distillation at 70° C./5 mm. Hg, until 5.8 kg. of a solution of concentration 36% by weight were obtained (the solids in this solution contained 2.05% of nitrogen and 7.0% of chlorine).

0.38 g. of hexa(methoxymethyl)melamine.

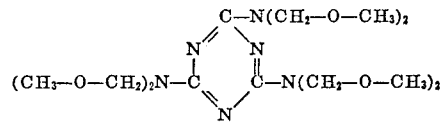

and 0.03 cm.³ of a 20% solution of p-toluenesulphonic acid in isopropanol were added to 6 g. of this concentrated solution; this fresh solution was cast onto a 12 x 25 cm. glass plate and heated, for 16 hours at 60° C. and then for 7 hours at 120° C. A membrane with quaternary ammonium groups was obtained having a permeation selec-

I claim:

1. Shaped or unshaped ionic polymers which comprise recurring units of formula

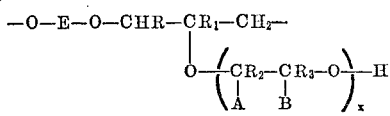 (I)

alone or with recurring units of formula

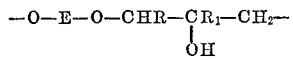 (II)

and/or of formula

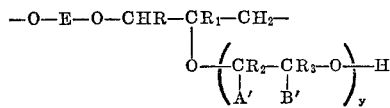 (III)

in which each of R, $R_1$, $R_2$ and $R_3$, which may be the same or different, represents a hydrogen atom or a methyl radical, E represents a divalent radical derived by removing the phenolic OH groups from a polynuclear diphenol in which the hydroxyl groups are attached to different nuclei, $x$ and $y$ are positive numbers, one of A and B represents a hydrogen atom and the other represents a radical of formula

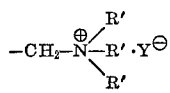

in which $Y^\ominus$ is an anion and each of the symbols R', which may be same or different, represents a monovalent or divalent organic radical, or at least two of the radicals together form a single divalent or trivalent radical, all the valencies carried by the R' groups being satisfied by nitrogen atoms of groups —$CH_2$—$N^\oplus$, and one of A' and B' represents a hydrogen atom and the other represents the —$CH_2X$ group, wherein X is a halogen atom.

2. Polymers according to claim 1 in which the three R' radicals together contain 3 to 1 carbon atoms.

3. Polymers according to claim 1 in which X is chlorine.

4. Polymers according to claim 1 in which E has the formula

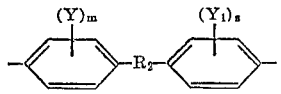

in which each of Y and $Y_1$, which may be the same or different, represents an alkyl or alkoxy radical having 1 to 4 carbon atoms; $R_4$ is an alkylene or alkylidene radical having 1 to 3 carbon atoms, and each of $m$ and $z$, which may be the same or different, is 0, 1, 2, 3 or 4.

5. Polymers according to claim 1 which have been treated with a base.

6. Polymers according to claim 1 which are in the form of membranes.

7. Polymers according to claim 1 which also contain recurring units of Formulae I', II' and III' derived from Formulae I, II and III defined in claim 1 by removal of the hydrogen atom of the OH groups, the resulting free valency of the oxygen atoms being connected by cross-linking agents.

8. Polymers according to claim 7 in which the cross-linking agent is formaldehyde, a urea-formaldehyde precondensate, dimethylolurea, trimethylolmelamine, hexa-(methoxymethyl)melamine, a chlorinated polyethylene glycol or a poly epichlorohydrin.

9. Process for the preparation of the polymers claimed in claim 1 which comprises reacting an epihalogenohydrin of formula

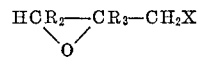

in which $R_2$, $R_3$ and X are as defined in claim 1 with a copolymer consisting essentially of units of formula

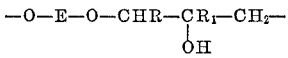 (II)

in which E, R and $R_1$ are as defined in claim 1, and then quaternising the resulting halogenated product with a mono- or poly-tertiary amine.

10. Process according to claim 9 in which the quaternisation is carried out after the halogenated intermediate polymer has been shaped.

11. Process according to claim 9 in which the copolymers with recurring units of Formula II have a reduced viscosity of between 15 and 120 cm.³/g., measured at 25° C. on a 2 g./l. solution in dimethylformamide.

12. Process according to claim 9 in which the quaternised polymer is reacted with a crosslinking agent conventionally employed with vinyl alcohol polymers.

13. Process according to claim 12 in which the crosslinking agent is formaldehyde, urea-formaldehyde precondensates, dimethylolurea, trimethylolmelamine, hexa-(methoxymethyl)melamine, a chlorinated polyethylene glycol or a polyepichlorohydrin.

14. Process according to claim 9 in which the polymer is cast as a film.

References Cited
UNITED STATES PATENTS
3,294,747  12/1966  Fry.

MELVIN GOLDSTEIN, Primary Examiner

U.S. Cl. X.R.
260—47 EP